June 22, 1954 — I. J. NOVAK — 2,681,870
METHOD OF FILLING OPEN MESH GLASS CLOTH WITH COLLOIDAL
ASBESTOS FIBERS AND ARTICLE PRODUCED THEREBY
Filed June 19, 1951
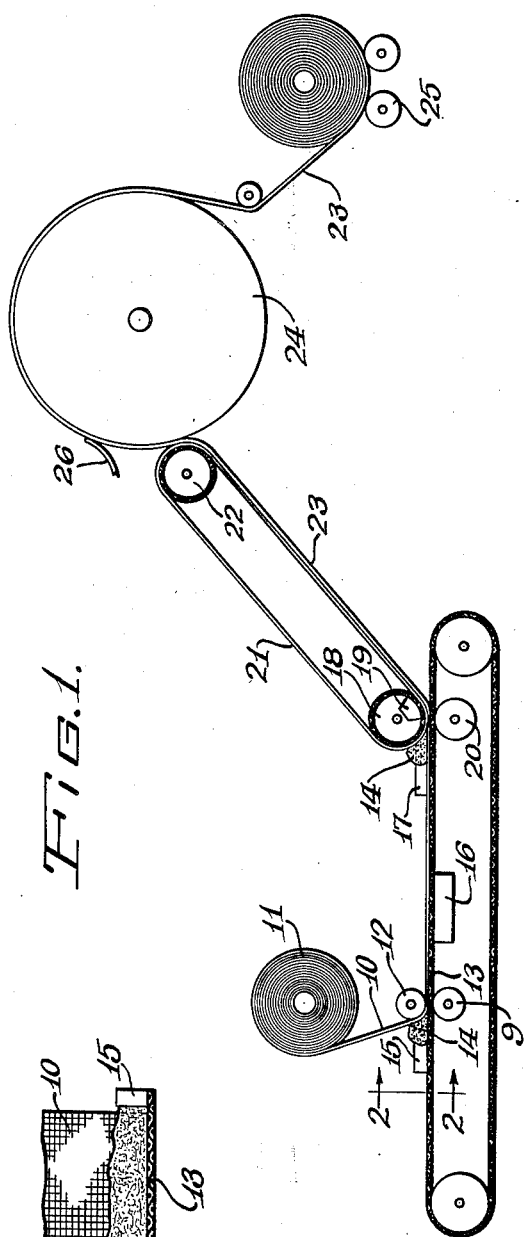
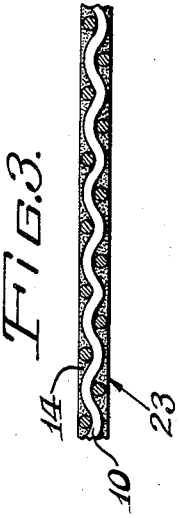
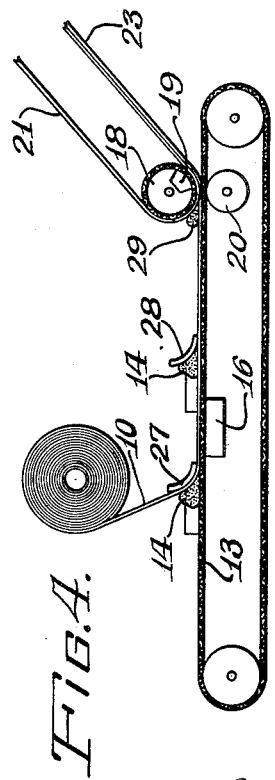
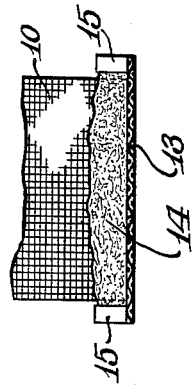
Inventor:
Izador J. Novak
By Gary, Desmond & Parker
Attys.

UNITED STATES PATENT OFFICE 2,681,870

METHOD OF FILLING OPEN MESH GLASS CLOTH WITH COLLOIDAL ASBESTOS FIBERS AND ARTICLE PRODUCED THEREBY

Izador J. Novak, Trumbull, Conn., assignor to Raybestos-Manhattan, Inc., Passaic, N. J., a corporation of New Jersey Application June 19, 1951, Serial No. 232,266

7 Claims. (Cl. 117—65)

This invention relates to a composite comprised of glass fibers and asbestos fibers, and more particularly to a fabric of open mesh woven glass cloth having its meshes filled and its surfaces coated with asbestos fibers, and the method of producing same.

The process and product of the present invention are further characterized by the employment of a colloidal dispersion of asbestos fibers, the latter being more fully described in my copending application, Serial No. 66,552 filed December 21, 1948, now U. S. Patent 2,626,213.

An advantage of my composite is that it enables the employment of the combination of glass fiber and asbestos fiber in a most advantageous manner whereby the disadvantages of one are compensated by the advantages of the other. For example, as is well known, materials composed essentially or primarily of glass fibers while having high tensile strength are subject to disintegration by vibration or friction, such as may occur in electrical installations; and further, as is well known, the heat resistance of glass is limited by its melting point. On the other hand, although asbestos products may have relatively little tensile strength, they have high heat and flame resistance and maintain their fibrous character without melting at temperatures far beyond the melting point of glass. Further, by employing a colloidal dispersion of asbestos, the dried residue thereof is characterized by such previous colloidal dispersion and a mixture of extremely fine fibers which forms a fine uniform coat for the glass fibers and protects the susceptibility of the glass to break down by vibration or friction.

In most cases it is desirable to impregnate the filled fabric with varnishes or apply coatings of bonding or adhesive materials in a separate operation, depending on the final use of the product. For example, the product may be treated with a silicone resin varnish and thereafter dried and polymerized in a high temperature tower to make cloth for high temperature resistant electrical insulating tape. My filled fabric is of special advantage in such coating or impregnating operations by reason of its resistance to delamination or separation of the constituent parts, and thus can be readily processed by conventional impregnating techniques such as coating rolls, dip rolls or the like, followed by rapid drying.

It has been proposed to form a plied structure composed of a center layer of glass cloth and thin asbestos paper on both sides. Such construction leaves unfilled voids within the structure, which tend to cause delamination and blistering when it is saturated with a binder and thereafter exposed to forced drying conditions. The structure of the present invention does not have this deficiency since the meshes are actually filled and the major portion of the fiber lies within the meshes rather than outside the fabric. Further, when a woven mesh fabric is covered by two preformed sheets, this requires bonding of the surface sheets between the meshes, which is difficult to accomplish and forms a sheet with irregular surfaces, composed of valleys and depressions and may entail undesirable excess of fiber overlying the meshes and a deficiency of fiber in the openings of the mesh.

In accordance with the present process, I can deposit an irregular layer of asbestos so that the interstices of the cloth are filled essentially to the thickness of the mesh fabric and with a minimum amount of fiber lying on the mesh, with the result that the end product is of smooth surface nature, is uniformly filled and of uniform thickness through the sheets or composite. Further, by employing my fibrous asbestos material I am able not only to fill the interstices of the fabric, but also I am able to form a strong interlocking series of colloidal fibers in any interstices of the weave itself. This, of course, is due to the employment of colloidally dispersed asbestos fibers and its plastic properties as if this fibrous colloidal dispersion was composed of non-fibrous filler.

It will, of course, be understood that the properties of the product are distinguished from a product which would be made by employing a non-fibrous filler in that the product has flexibility and retains the coating and filling as an integral part thereof without any tendency of the fibrous filler to leave the spaces between the yarns.

In the practice of the present invention, application of the asbestos takes place on a papermaking machine which may employ a wire screen or a paper-making felt, wherein glass cloth, preferably open mesh, is continuously fed to the porous carrier and the viscous colloidal asbestos dispersion applied by a spreading technique to the opposed sides of the mesh cloth which coats the cloth by pressing the asbestos into the openings of the cloth and becomes interlocked with the surface and through the openings of the cloth and between the yarns to form a complete closure, after which the composite of applied material and cloth is dried on a drying drum or in a drying chamber.

The colloidal asbestos is employed in the form of a thick viscous slurry or dough in a concentration of about 3 to 8%, or, for example, 5%, depending upon the fiber length, which influences the viscosity of the dough. In general, long fiber asbestos should be employed in order to bridge the openings of the fiberglas mesh cloth employed or at least to form a filling for the spaces in the glass cloth. Thus, if the meshes are of fairly large size it follows that longer fibers should be applied; conversely, if the meshes are relatively small, shorter fibers may be employed. Thus the range of fibers is from paper-making grade to spinning grade.

An ordinary water mixture of asbestos fibers of paper making or spinning grade would not be suitable or capable of use in this process since, first, such a slurry would be clotty in character depending on the fiber length and more so as the fiber length was increased, and therefore could not be applied to make a uniform filling; and second, if it were attempted to build up the viscosity by increasing the concentration of fiber, the major portion of the fiber would be formed in very uneven fashion on the surface of the glass fabric rather than within its meshes and certainly would end up with greatly increased thickness over that of the fabric itself. However, by using a colloidal dispersion I get the applied fiber within the meshes with as little as desired above the cloth, and there is no clotted condition or uneven concentration of fiber. Further, my process does not require the introduction of extraneous binders with the asbestos in order to form a viscous or spreadable paste as might be the case if one were to attempt to apply a thin slurry of ordinary asbestos. The reason for this is that one of the characteristics of my colloidal dispersions even at a 5% slurry concentration the slurry is quite viscous and may be spread like a paste without inclusion of extraneous binders. Thus, for example, a 5% slurry of paper-making grade of asbestos fibers, prepared, for example, by the use of ammonium oleate as the dispersing agent, is essentially self sustaining, to the extent that it can be laid between the nip of a roll and a movable carrier. It will rest there in the form of a rotating roll and only require moderate and light confinement to retain it in place without flowing or spreading sidewise. It has the same range of viscosity as that used, for example, in spreading solvent rubber compounds on a conventional cloth spreader.

The colloidal dispersion of asbestos fibers in the form of a viscous slurry which I employ herein, may be made directly from untreated asbestos fibers in accordance with the teachings of my aforesaid copending application, Serial No. 66,552 employing one of the many asbestos dispersing agents therein described, one example of which is as follows: To 1000 pounds of water at 160° F. was added 25 pounds of sodium oleate as red oil soap, and the soap dissolved therein. To this was added 50 pounds of mill fiber of spinning grade such as Bell's Asbestos Mines 3R, and mixed therewith in a mixer with vertical cylindrical bars rotating therein for two hours to develop a smooth viscous dispersion of 5% asbestos concentration.

Other asbestos dispersing agents may be employed as indicated in my aforesaid application, among which may be mentioned Aerosol O. T. (dioctyl sodium sulfosuccinate); Triton 770 (aryl polyether sulfate; ammonium oleate; Nacconol NR (sodium aryl alkyl sulfonate); and others.

When it is necessary or desirable to employ a refined slurry such as for example in the production of products of electrical grade, the above described heavy slurry is diluted with added water and further stirring to about a 3/8% slurry, and then passed through paper-making fiber cleaning devices, such as screens, centrifugal cleaners, and magnetic separators, to remove unopened clots, hard bits, particles of magnetite and the like. Since this slurry is too dilute for use in the present process, it is concentrated by sheeting it out on a paper-making machine and dried. This dried paper is then converted to a slurry for use in the present process as follows: 25 parts by weight of the dry paper is re-dispersed in a dough-mixer with 72½ parts of water containing 2½ parts of Aerosol O. T. until no fiber clumps remain, and the doughy mix is perfectly smooth. This is then diluted with four times its weight of water while mixing to form a viscous 5% asbestos paste which is ready for use as a coating material. When employing a previously prepared paper composed of a dry residue of a colloidal dispersion of asbestos, as above described, it will be understood that in preparing therefrom the coating paste, I may employ the same dispersing agent as was employed in making the initial colloidal dispersion, or a different one.

The coating slurry or paste may also be prepared in another two-step process as follows: Untreated asbestos fibers are suspended at a 5% concentration in a solution containing a proportion of agent insufficient to form a colloidal dispersion, for example, 2% based on the fibers of Aerosol O. T., or 3% of ammonium oleate, or 5% of sodium aryl alkyl sulfonates (Nacconol NR), and this suspension is then passed through paper-making fiber cleaning devices as previously described. Thereafter additional asbestos dispersing agent is added, for example to a total of 10% by weight of the fibers to form a dispersed colloidal 5% asbestos paste. The addition, of course, is made in a mixer suitable for the great increase in viscosity developed by the change from a thin suspension to the colloidal dispersion.

It will be further understood, as will be apparent from the foregoing, the dispersions employed herein are of a stable character, as distinguished from temporary suspensions, and that they are characterized by fibers of an individualized as distinguished from clotted character, preponderately of a colloidal transverse dimension or diameter, the dispersion exhibiting characteristic colloidal properties such as increased viscosity, Tyndall effect, etc.

The invention will be further described in connection with the accompanying diagrammatic drawings wherein:

Fig. 1 is a side elevational view of an arrangement of apparatus for carrying out the process of the present invention.

Fig. 2 is a fragmentary section on the line 2—2 of Fig. 1.

Fig. 3 is a fragmentary, enlarged, diagrammatic section of a coated and filled fabric formed by the process of the present invention.

Fig. 4 is a view similar to that of Fig. 1 illustrating a modified form of apparatus.

A preferred method of applying my colloidal dispersion of asbestos fibers to an open mesh glass cloth having 10 to 24 meshes per inch to coat and fill it is as follows: Referring to Fig. 1, open mesh glass cloth 10, from a supply roll 11, is fed into the nip of the machine roll 12 resting on the endless wire screen carrier 13 and supporting roll 9. A colloidal dispersion of asbestos fibers, in the form of a 5% viscous slurry or paste 14 is applied in the nip between the carrier screen 13 and the glass cloth 10 as it passes over the roll 12, thereby being forced into the meshes of the glass cloth from its underside. The asbestos paste 14 is laterally confined on the screen by means of a pair of side guides 15, and is either intermittently or continuously supplied thereto from a suitable source, not shown. Being of a viscous character, and under the movements of the screen 13 and the glass cloth web 10, the asbestos paste 14 assumes a substantially cylindrical form at the nip of the roll 12 and the screen 13, permitting an excess supply of the paste to be maintained thereat for continuous coating.

The glass cloth then passes along in contact with the wire carrier 13 over a suction box 16 which removes air bubbles from the deposit in the meshes. Beyond the suction box, another application of the colloidally dispersed asbestos paste 14, similarly confined by side guides 17, is made at the nip of foraminous roll 18 resting on the top surface of the glass cloth 10, to thereby apply the asbestos to the top surface of the glass cloth. Preferably, this roll 18 contains a vacuum box 19 which removes additional entrapped air from both coatings thus applied, leaving the meshes thoroughly filled. The roll 18 rests on the roll 20 so that at this point not only is there a metering or doctoring of any excess of the applied coatings, but in addition there is a merging and mixing of the fibers of both applied coatings which results are aided by this action of the vacuum box 19, so that there results an interlock and filling of the meshes without a dividing line between the upper and lower applications. It is also essential to remove entrapped air bubbles from the applied paste because otherwise some of the meshes would be left unfilled, the vacuum box 19 functioning for this purpose also.

The vacuum roll 18 where the second application is made and the coating and filling finally set in place, carries an endless pick-up felt 21 around it and the transfer roll 22, which serves to lift the now composite fabric 23 from the wire carrier 13 and transfers it with light smoothing pressure to the surface of a Yankee drier 24 where the fabric 23 is dried, and then removed by wind-up means generally indicated at 25. A wiper 26 may be provided to smooth the outside surface of the composite fabric at a point before it is dry so as to overcome the roughening effect of the felt 21 which had been in contact with the upper surface of the filled fabric.

Fig. 4 shows a modified form of apparatus similar to that of Fig. 1 with the principal difference that fixed arcuate spreader plates 27 and 28 are employed to apply the asbestos slurry to the glass cloth instead of the rolls 12 and 18 respectively. Thus, in this instance, as the glass cloth 10 is drawn over the convex surface of the spreader plate 27 and onto the screen 13, it is supplied with asbestos from the viscous slurry body 14 to coat its underside, and then subjected to suction at box 16. The upper side of the glass cloth is then supplied with a coating as it passes the second spreader plate 28 from the slurry body maintained in front of it. The web 10, after being thus coated on both sides passes between roll 18 provided with the vacuum box 19 and roll 20, where excess slurry is squeezed out as at 29 and removed from time to time continuously. The various bodies of viscous asbestos slurry may be laterally confined by side guides or in the alternative by means of air jets, not shown.

A leno weave glass cloth having a thread count of 39x24 (24x24 mesh) and weighing two ounces per 40¼" wide running yard weighed 3.3 oz. per running yard after coating and filling with asbestos, representing a composition of about 60 parts by weight of glass fiber, 40 parts asbestos fiber. It was thoroughly filled and coated, soft and flexible, with no tendency to separate or delaminate on handling.

Larger mesh fabrics picked up larger proportions of asbestos in proportion to the relative size of the openings and the glass yarn.

Various other modification in the details of apparatus may be employed, the important qualification being that the slurry to be applied is in excess of that going with the fabric, and that vacuum equipment be placed in at least two points during the passage of the composite, that is at least one vacuum means after each slurry application, so as to remove trapped air which might otherwise leave holes in the mesh, and thus allow the mesh to be completely and uniformly filled with the colloidal asbestos.

I claim as my invention:

1. A composite fabric comprised of an open mesh woven glass cloth coated and its meshes completely filled with dry residue of a colloidal dispersion of asbestos fibers.

2. A composite fabric comprised of an open mesh woven glass cloth coated on its opposed faces with dry residue of a coloidal dispersion of asbestos fibers, said asbestos fibers extending through and completely filling said meshes.

3. A composite flexible fabric comprised of an open mesh cloth of twisted and woven glass yarn coated and filled with dry residue of a colloidal dispersion of asbestos fibers, said asbestos fibers completely filling the meshes of the glass cloth and extending into interstices in the twist of the glass yarn and into interlocking engagement therewith.

4. The method of forming a glass-asbestos fabric which comprises coating an open mesh woven glass cloth by spreading thereover and pressing into its meshes a viscous colloidal dispersion of asbestos fibers, and drying the composite.

5. The method of forming a flexible glass-asbestos fabric which comprises spreading a viscous colloidal dispersion of asbestos fibers over an open mesh glass cloth in excess of the amount required to fill said meshes, applying vacuum thereto to remove entrapped air, substantially removing said excess asbestos, pressing the remaining asbestos into the openings of the cloth and into interlocking engagement with its surfaces, and then drying.

6. The method of forming a fixeible glass-asbestos fabric, which comprises successively spreading onto the opposed surfaces of an open mesh glass cloth, a viscous colloidal dispersion of asbestos fibers in excess of the amount required to fill said meshes, successively applying vacuum to the opposed coated surfaces to remove entrapped air, jointly pressing the opposed coated surfaces to fill the meshes with said asbestos fibers and substantially remove excess thereof and to merge and blend the opposed coatings within the meshes, and then drying the composite.

7. The method of forming a composite flexible fabric, which comprises the continuous process of applying an open mesh woven glass cloth onto the surface of a moving endless foraminous carrier by passing said cloth over an arcuate surface positioned adjacent to said carrier, providing and maintaining a viscous body of an aqueous colloidal dispersion of asbestos fibers of from about 3% to about 8% concentration at the nip formed by said arcuate surface between said carrier and said cloth to apply a coating of said asbestos to the underface thereof, applying suction to said coated face to remove entrapped air, applying asbestos from a second body thereof to the upper face of said cloth, subjecting the opposed coated faces of said cloth to rolling pressure to fill the meshes thereof with and to substantially remove excess asbestos therefrom, and applying suction to said second coated face to further remove entrapped air and then drying the composite.

References Cited in the file of this patent

UNITED STATES PATENTS

| Number | Name | Date |
|---|---|---|
| 1,505,694 | Bentel | Aug. 19, 1924 |
| 2,114,618 | Wallin | Apr. 19, 1938 |
| 2,215,150 | Hannen | Sept. 17, 1940 |
| 2,216,759 | Simison | Oct. 8, 1940 |
| 2,230,271 | Simpson | Feb. 4, 1941 |
| 2,298,295 | Hyatt et al. | Oct. 13, 1942 |
| 2,546,230 | Modigliani | Mar. 27, 1951 |